United States Patent [19]

Ryoke et al.

[11] Patent Number: 5,094,908

[45] Date of Patent: Mar. 10, 1992

[54] MAGNETIC RECORDING MEDIUM

[75] Inventors: Katsumi Ryoke; Masatoshi Takahashi; Toshihiko Miura, all of Kanagawa, Japan

[73] Assignee: Fuji Photo Film Co., Ltd., Kanagawa, Japan

[21] Appl. No.: 558,539

[22] Filed: Jul. 27, 1990

[30] Foreign Application Priority Data

Jul. 28, 1989 [JP] Japan .................................. 1-196030

[51] Int. Cl.$^5$ .............................................. G11B 23/00
[52] U.S. Cl. .................................... 428/323; 427/131; 428/329; 428/694; 428/900
[58] Field of Search ............... 428/694, 900, 329, 323; 427/131

[56] References Cited

U.S. PATENT DOCUMENTS

| | | | |
|---|---|---|---|
| 4,588,647 | 5/1986 | Sakurai et al. | 428/694 |
| 4,728,569 | 3/1988 | Ryoke et al. | 428/694 |
| 4,798,755 | 1/1989 | Yamada et al. | 422/694 |

Primary Examiner—Paul J. Thibodeau
Attorney, Agent, or Firm—Sughrue, Mion, Zinn, Macpeak & Seas

[57] ABSTRACT

A magnetic recording medium is disclosed, which comprises a non-magnetic support having on one surface of the support a backing layer containing carbon black and a binder and on the opposite surface of the support a magnetic recording layer containing a ferromagnetic power and a binder, the ferromagnetic powder being oriented in the magnetic recording layer such that the ratio of the number of diffraction points N(220)/N(113) measured at the surface region of the magnetic layer by high energy electron diffraction is at most 1.65; and the squareness ratio Br/Bm of the magnetic layer is from 0.830 to 0.860 at 25° C. The medium has excellent running durability, S/N ratio, and dropout properties.

19 Claims, No Drawings

MAGNETIC RECORDING MEDIUM

FIELD OF THE INVENTION

The present invention relates a magnetic recording medium, and more particularly, to a medium having a magnetic recording layer and a backing layer.

BACKGROUND OF THE INVENTION

Magnetic recording media for audio equipment, video deck and computer (e.g., disc and memory tape) use commonly include a non-magnetic support having thereon a magnetic layer comprising a ferromagnetic powder dispersed in a binder.

In recent years, there has been a growing demand for high density recording. To this end, the signal/noise ratio (S/N) has been improved by employing finer powders of ferromagnetic materials or powdered ferromagnetic alloys, packing the ferromagnetic powder at a higher density, or extremely smoothing the surface of the magnetic recording medium so that a higher signal level or lower noise level can be obtained. In order to permit high density recording, it is necessary that the time for writing and reading on the magnetic recording medium be shortened. This requires the magnetic recording medium to travel at a high speed. Since the magnetic recording medium needs to be adapted to travel at a high speed, it also needs to exhibit excellent running performance, antistatic property and head cleaning properties. To this end, fillers such as carbon black and abrasive having a Mohs' hardness of 8 or more have been employed. Specific examples of such fillers are disclosed in U.S. Pat. Nos. 3,630,910, 3,833,412, 4,614,685, and 4,539,257, and JP-A-59-193,533 (the term "JP-A" as used herein means an "unexamined published Japanese patent application").

However, even with these approaches, it has been extremely difficult to fully satisfy running durability when the tape travels at a high speed. The reason for this problem is that a high S/N can be obtained only by making the magnetic recording medium ultrasmooth which increases the friction coefficient of the magnetic tape.

The inventors have made extensive studies to lower the friction coefficient of an ultrasmooth surface.

In particular, in order to maximize the output from the magnetic tape, it is conventional to orient ferromagnetic particles with their longer axis parallel to the running direction of the tape in the coating surface, and as horizontal as possible in the running direction. While this approach permits an increase in the output and an improvement in the squareness ratio (Br/Bm), it fails to eliminate dropout or improve running durability such as still life. Dropout may be caused by a binder, but is more often caused by a ferromagnetic powder. The inventors have investigated the friction coefficient of ferromagnetic powder and its effect on dropout. As a result, it has now been found that the orientation of the ferromagnetic powder present in the magnetic layer has a great effect on the friction coefficient of ferromagnetic powder and the occurrence of dropout. In order to solve these problems, the orientation of the ferromagnetic powder was studied by a high energy electron ray diffraction method. As a result, it has now been discovered that the orientation of the ferromagnetic powder has a significant relationship to dropout, still life, and squareness ratio (Br/Bm).

SUMMARY OF THE INVENTION

An object of the present invention is to provide a magnetic recording medium excellent in running durability as well as S/N.

Another object of the present invention is to provide a magnetic recording medium having improved dropout (DO) properties, still life and color S/N.

These and other objects of the present invention will be apparent from the following detailed description an examples.

It has now been found that these and other objects of the present invention are accomplished by a magnetic recording medium comprising a non-magnetic support having on one surface of the support a backing layer comprising a carbon black and a binder and on the opposite surface of the support a magnetic recording layer comprising a ferromagnetic powder and a binder, said ferromagnetic powder being oriented in said magnetic recording layer such that the ratio of the number of diffraction points N(220)/N(113) measured at the surface region of the magnetic layer by high energy electron diffraction is at most 1.65; and the squareness ratio Br/Bm of the magnetic layer is from 0.830 to 0.860 at 25° C.

DETAILED DESCRIPTION OF THE INVENTION

More preferably the present invention relates to a magnetic recording medium wherein the glossiness of the magnetic layer is in the range of 150 to 200.

The magnetic recording medium of the present invention has a structure in which a magnetic layer typically containing a ferromagnetic powder and a binder is provided on one side of a non-magnetic support and a backing layer containing a binder and carbon black is provided on the other side of the non-magnetic support.

The inventors have found that excellent running durability and S/N can be obtained by controlling the ratio of the number of diffraction points from the ferromagnetic powder in the surface region of the magnetic layer, i.e., N(220)/N(113) as determined by high energy electron diffraction to be 1.65 or less. The "surface region" herein used means the region within the depth of 50 angstroms from the surface of the magnetic layer. The plane orientation of acicular crystals on the surface of the magnetic layer can be defined in terms of the ratio of the number of diffraction points from the ferromagnetic powder in the surface region of the magnetic layer, i.e., N(220)/N(113) as determined by high energy electron diffraction. When this ratio is in the range of 1.65 or less, the acicular crystal is oriented generally perpendicular to the surface of the magnetic layer. This also means that the extreme point of the acicular crystal is exposed, thus improving the friction coefficient of the magnetic layer and providing superior anchoring in the binder. In particular, the term "N(220)" as used herein refers to the plane of the acicular ferromagnetic particle along its major axis, and "N(113)" refers to the plane of the acicular ferromagnetic particle along its minor axis.

Accordingly, when N(220) is large, it means that the plane of the acicular ferromagnetic particle along its major axis is exposed more at the surface of the magnetic layer. This also means that more ferromagnetic particles are oriented parallel to the plane of the magnetic layer. When N(113) is large, it means that the plane of the acicular ferromagnetic particle along its minor axis is exposed more at the surface of the magnetic layer. This also means that more ferromagnetic particles are oriented perpendicular to the plane of the magnetic layer. The ratio of N(220)/N(113) of 1.65 is a point at which properties of the magnetic layer markedly change. When this ratio is greater than 1.65, it means that N(220) plane is exposed more at the surface of the magnetic layer, that is, the acicular ferromagnetic particle is oriented along or parallel to the plane of the magnetic layer. On the contrary, when this ratio is smaller than 1.65, it means that N(220) plane is exposed less as the ferromagnetic particle is oriented perpendicular or vertical to the plane of the magnetic layer. When the acicular ferromagnetic particle is oriented parallel to the plane of the magnetic layer, the squareness ratio is raised, increasing the output. However, in such an orientation, the acicular ferromagnetic particle exhibits a weak adhesion to the binder and thus provides reduced strength. On the other hand, when the acicular ferromagnetic particle is oriented perpendicular to the plane of the magnetic layer, the squareness ratio is lowered, making it difficult to produce a high output. However, in such an orientation, the acicular ferromagnetic particle exhibits a strong adhesion to the binder and thus provide an improved strength. In the present invention, the value of N(220)/N(113) is defined to provide a magnetic recording medium which meets the requirement for squareness ratio, surface glossiness, output and running durability.

In the present magnetic recording medium, when the ratio of the number of diffraction points from the ferromagnetic powder in the surface region of the magnetic layer, i.e., N(220)/N(113) as determined by a high energy electron diffraction method is controlled to 1.65 or less, the effective crystal plane of the ferromagnetic particle in the surface of magnetic layer is increased, providing an improved running durability. This effect is particularly remarkable when the ratio of the number of diffraction points from the ferromagnetic powder in the surface of the magnetic layer, i.e., N(220)/N(113) is controlled to be within the range of from 1.1 to 1.65, more preferably from 1.2 to 1.65 and most preferably from 1.3 to 1.65. When the ratio of the number of diffraction points from the ferromagnetic powder in the surface of the magnetic layer, i.e., N(220)/N(113) is greater than 1.65, the friction coefficient of the surface of the magnetic layer is increased, deteriorating the running durability of the magnetic recording medium. When the ratio of the number of diffraction points from the ferromagnetic powder in the surface of the magnetic layer, i.e., N(220)/N(113) is less than 1.1, the surface of the magnetic layer tends to be roughened, increasing noise and lowering S/N.

In order to control the value of N(220)/N(113) to 1.65 or less, the following method can be employed. In particular, N(220)/N(113) can be controlled by altering the squareness ratio of the magnetic recording medium. To this end, the orientation current can be controlled within the range of from 50 to 300 angstroms, or the orientation conditions can be altered, that is, the intensity of the magnetic field can be increased or decreased or the time during which the magnetic recording medium is allowed to stand in the magnetic field for orientation can be reduced or increased. The intensity of the magnetic field is preferably in the range of 700 to 4000 gauss, preferably 1000 to 4000 gauss and more preferably 1500 to 4000 gauss. The retention time for orientation is preferably in the range of 0.1 second or less.

When N(220)/N(113) is Y and the squareness ratio of the magnetic layer at 25° is X, they preferably satisfy the relationship:

$$Y = 6.24165X - 3.7922 + 0.1837$$

that is, $$-3.9759 < Y - 6.24165X < -3.6085$$

When the glossiness (as defined below) of the magnetic layer is controlled to between 150 and 200, a magnetic recording medium excellent in running durability as well as S/N is obtained. In general, when the glossiness of the magnetic layer is increased, it increases the friction coefficient of the magnetic layer and often increases the content of plastic components in the coating film. In the present invention, however, if the ratio of the number of diffraction points from the ferromagnetic powder in the surface of the magnetic layer, i.e., N(220)/N(113) is controlled to 1.65 or less, a magnetic recording medium excellent in various properties can be obtained even when the glossiness of the magnetic layer is 150 or more, and the glossiness is preferably 150 to 180 and more preferably 155 to 175.

The "glossiness" of the present magnetic recording medium as used herein is determined by mirror-like glossiness at an incident angle of 45° and a reflective angle of 45° as defined in JIS8741, i.e., is expressed relative to that of a black glass with a refractive index of 1.567 as 100%.

When the squareness ratio (Br/Bm) of the magnetic layer at a temperature of 25° C. is controlled to between 0.830 and 0.860, a magnetic recording medium excellent in running durability as well as S/N can be obtained. In general, when the squareness ratio is increased, it is disadvantageous in that the ferromagnetic particles are arranged in the tape-running direction (orientation direction), causing the magnetic layer to be easily tearable in the running direction (orientation direction) under an external force. In the present invention, however, if the ratio of the number of diffraction points from the ferromagnetic powder in the surface of the magnetic layer, i.e., N(220)/N(113) is controlled to 1.65 or less, a magnetic recording medium excellent in running durability can be obtained even when the squareness ratio (Br/Bm) is 0.830 or more. However, if the squareness ratio (Br/Bm) exceeds 0.860, sufficient running durability cannot be easily obtained even when the ratio of the number of diffraction points from the ferromagnetic powder in the surface of the magnetic layer, i.e., N(220)/N(113) is controlled to 1.65 or less. In the present invention, the squareness ratio (Br/Bm) is preferably 0.840 to 0.860 and more preferably 0.845 to 0.860.

The squareness ratio (Br/Bm) of the present magnetic recording medium at a temperature of 25° C. means residual magnetic flux density/maximum magnetic flux density obtained by an sweeping external magnetic field at 2 KOe.

Examples of the ferromagnetic powder which can be used in the present invention include powders of $\gamma$-$Fe_2O_3$, Co-containing (adsorbed, modified or doped) $\gamma$-$Fe_2O_3$, $Fe_3O_4$, Co-containing (adsorbed, modified or doped) $\gamma$-$Fe_3O_4$, $FeO_x$, and Co-containing (adsorbed, modified or doped) $\gamma$-$FeO_x$ (in which x is in the range of 1.33 to 1.50).

Such a finely divided ferromagnetic powder has a particle size (long-axis length) of about 0.005 to 1 $\mu$m preferably 0.05 to 0.5 μm, more preferably 0.05 to 0.4 μm, and an acicular ratio (length/width ratio) of 1/1 to 50/1, preferably 3/1 to 20/1, more preferably 5/1 to 10/1. Such a ferromagnetic powder also has a specific surface area of 1 to 70 m$^2$/g, preferably 30 to 60 m$^2$/g, more preferably 30 to 50 m$^2$/g. Such a ferromagnetic powder has a water content of 0.2 to 2.0 wt. %. If such a ferromagnetic powder is used, its content in the coating solution is in the range of 0.00 to 2.00 wt. %. A dispersant, lubricant, or anti-static agent described below may be adsorbed onto the surface of such a ferromagnetic powder by dipping the ferromagnetic powder in a solvent containing such an additive prior to dispersion.

The finely divided ferromagnetic powder to be incorporated in the magnetic layer includes cobalt-containing iron oxide as described in U.S. Pat. No. 3,573,980 and *J. de. Phys*, 37 (1976) C6-301. When the iron oxide contains divalent iron in an amount of 1 to 5% by weight based on the weight of trivalent iron, a magnetic recording medium excellent in running durability as well as S/N can be obtained. If the content of divalent iron falls below 1% by weight, it is not advantageous in that a poor S/N is provided. If this content exceeds 5% by weight, it is not advantageous in that the bond between the ferromagnetic powder and the binder is reduced, causing undesirable results in running durability.

The binder incorporated in the present magnetic layer and backing layer includes a known thermoplastic resin, thermosetting resin, reactive resin or a mixture thereof.

As such a thermoplastic resin there can be used a thermoplastic resin having a softening point of 150° C., an average molecular weight of 10,000 to 300,000 and a polymerization degree of about 50 to 2,000. Examples of such a thermoplastic resin include vinyl chloride-vinyl acetate copolymer, vinyl chloride polymer, vinyl chloride-vinylidene chloride copolymer, vinyl chloride-acrylonitrile copolymer, acrylic ester-acrylonitrile copolymer, acrylic ester-vinylidene chloride copolymer, acrylic ester-styrene copolymer, methacrylic ester-acrylonitrile copolymer, methacrylic ester-vinylidene chloride copolymer, methacrylic ester-styrene copolymer, urethane elastomer, nylon-silicone resin, nitrocellulose-polyamide resin, vinyl polyfluoride, vinylidene chloride-acrylonitrile copolymer, butadiene-acrylonitrile copolymer, polyamide resin, polyvinyl butyral, cellulose derivatives (e.g., cellulose acetate butyrate, cellulose diacetate, cellulose triacetate, cellulose propionate, nitrocellulose, ethyl cellulose, methyl cellulose, propyl cellulose, methyl ethyl cellulose, carboxyl methyl cellulose, acetyl cellulose), styrene-butadiene copolymer, polyester resin, chlrovinyl ether-acrylic ester copolymer, amino resin, various synthetic rubber thermoplastic resins, and mixtures thereof.

The thermosetting resin or reactive resin has a molecular weight of 200,000 or less in the form of coating solution. When the thermosetting resin or reactive resin is coated, dried and heated to undergo condensation, addition or a like reaction, its molecular weight becomes infinite. Preferred among these resins are those which do not soften or melt before they undergo thermal decomposition. Specific examples of such resins include phenolic resin, phenoxy resin, epoxy resin, polyurethane hardening resin, urea resin, melamine resin, alkyd resin, silicone resin, acrylic reactive resin, epoxy-polyamide resin, nitrocellulose melamine resin, a mixture of high molecular polyester resin and isocyanate prepolymer, a mixture of methacrylate copolymer and diisocyanate prepolymer, a mixture of polyester polyol and polyisocyanate, urea formaldehyde resin, a mixture of low molecular glycol, high molecular diol and triphenylmethane triisocyanate, polyamine resin, polyimine resin, and mixtures thereof.

These thermoplastic resins, thermosetting resins and reactive resins each normally contain 1 to 6 functional groups other than main functional groups, such as acidic group (e.g., carboxylic acid, sulfinic acid, sulfenic acid, sulfonic acid, phosphoric acid, sulfuric acid, phosphone, phosphine, boric acid, sulfuric ester, phosphoric ester, alkyl esters thereof (these acidic groups may be in the form of a sodium salt)), amino acids (e.g., aminosulfonic acid, sulfuric or phosphoric ester of amino alcohol), amphoteric compounds (e.g., alkyl betaine), an amino group, imino group, imide group, amide group, epoxy group, hydroxyl group, alkoxyl group, thiol group, halogen atom, silyl group, and siloxane group. Each functional group is preferably incorporated in the resin in an amount of $1 \times 10^{-6}$ to $1 \times 10^{-2}$ equivalent per g of resin.

Of these resins, polyvinyl chloride, vinyl chloride-vinyl acetate copolymer, nitrocellulose, polyurethane and polyester are preferred.

These binders may be used singly or in combination. Other additives may be incorporated in the binder. The mixing ratio of ferromagnetic powder and binder in the magnetic layer is 100/5 to 100/300, preferably 100/12 to 100/30, in terms of parts by weight. The mixing ratio of carbon black and binder in the backing layer is 100/30 to 100/300, preferably 100/45 to 100/130, in terms of parts by weight. Examples of other additives which can be incorporated in the layer include a curing agent (e.g., polyisocyanate), dispersant, lubricant, abrasive, antistatic agent, oxidation inhibitor, and solvent.

Examples of the polyisocyanate which can be used as a curing agent in the present invention include isocyanates such as tolylene diisocyanate, 4,4'-diphenylenemethane diisocyanate, hexamethylene diisocyanate, xylene diisocyanate, naphthylene-1,5-diisocyanate, o-toluidine diisocyanate, isophorone diisocyanate, triphenylmethane triisocyanate, and isophorone diisocyanate, reaction products of isocyanates and polyalcohols, and dimmer to pentadecamer polyisocyanates produced by the condensation of isocyanates. These polyisocyanates preferably have an average molecular weight of 100 to 20,000. Examples of the trade names of commercialy available polyisocyanates include Colonate L, Colonate HL, Colonate 2030, Colonate 2031, Millionate MR, Milionate MTL (available from Nihon Polyurethane K.K.), Takenate D-102, Takenate D-110N, Takenate D-200, Takenate D-202, Takenate 300S, Takenate 500 (available from Takeda Chemical Industries, Ltd.), Sumidur T-80, Sumidur 44S, Sumidur PF, Sumidur L, Sumidur N, Desmodur L, Desmodur IL, Desmodur N, Desmodur HL, Desmodur T65, Desmodur 15, Desmodur R, Desmodur RF, Desmodur SL, and Desmodur Z4273 (available from Sumitomo Bayer). These polyisocyanates can be used singly or in a combination of two or more thereof taking advantage of the difference in curing reactivity therebetween. These polyisocyanates can be used in combination with compounds containing hydroxyl groups (e.g., butanediol, hexanediol, polyuretahne having a molecular weight of 1,000 to 10,000, water) or amino group (e.g., monomethylamine, dimethylamine, trimethylamine) or metal oxide catalysts for the purpose of accelerating the curing reaction.

These hydroxyl group- or amino group-containing compounds preferably are polyfunctional. These polyisocyanates are preferably used in an amount of 5 to 40% by weight based on the total weight of binder.

Examples of dispersants which can be used in the present invention include $C_{10-26}$ aliphatic acids ($R_1COOH$ in which $R_1$ is a $C_{9-25}$ alkyl group) such as caprilic acid, capric acid, lauric acid, myristic acid, palmitic acid, stearic acid, behenic acid, oleic acid, elaidic acid, linoleic acid, linolenic acid and stearolic acid; metallic soaps made of salts of the above mentioned aliphatic acids with alkaline metals (e.g., Li, Na, K, $NH_4^+$), alkaline earth metals (e.g., Mg, Ca, Ba), Cu, Pb or the like; amides of the above mentioned aliphatic acids; and lecithin. Other examples of dispersants which can be used in the present invention include higher alchols containing 4 or more carbon atoms (butanol, octyl alcohol, myristyl alcohol, stearyl alcohol), sulfuric and phosphoric esters thereof, and amine compounds thereof. Furthermore, polyalkylene oxides, sulfuric and phosphoric esters thereof, amine compounds thereof, sulfosuccinic acid, and sulfosuccinic ester and the like can be used. Substituents such as Si and F can be incorporated in these compounds to alter the compatibility thereof with the binder and the properties thereof. These dispersants can be normally used in combination. The amount of each dispersant to be incorporated is in the rang of 0.005 to 20 parts by weight based on 100 parts by weight of binder. These dispersants may be previously attached to the surface of ferromagnetic powder of non-magnetic powder or may be incorporated in the system during dispersion.

Other examples of compounds which can be preferably used as dispersants include surface active agents such as carboxylic acid and phosphoric ester, and fluorine surface active agents Florad FC95, FC129, FC430, and FC431 (available from 3M).

Examples of lubricants and oxidation inhibitors to be incorporated in the present magnetic layer and backing layer include finely divided powders of inorganic substance such as molybdenum disulfide, boron nitride, graphite fluoride, calcium carbonate, barium sulfate, silicon oxide, titanium oxide, zinc oxide, tin oxide and tungsten disulfide, finely divided powders of acrylstyrene resin, benzoguanamine resin, melamine resin, polyolefin resin, polyester resin, polyamide resin, polyimide resin, and ethylene polyfluoride resin, silicone oil, aliphatic acid-modified silicone oil, graphite, fluorine alcohol, polyolefin (e.g., polyethylene wax), polyglycol (e.g., polyethylene oxide wax), tetrafluoroethylene oxide wax, polytetrafluoro glycol, perfluoroaliphatic acid, perfluoroaliphatic ester, perfluoroalkylsulfuric ester, perfluoroalkylphosphoric ester, alkylphosphoric ester, polyphenyl ether, and organic lubricants such as aliphatic esters of a $C_{10-20}$ monobasic aliphatic acid and any one or more of $C_{3-12}$ monovalent, divalent, trivalent, tetravalent and hexavalent alcohols; and aliphatic esters of a monobasic aliphatic acid containing 10 or more carbon atoms and a monovalent to hexavalent alcohol having 11 to 28 carbon atoms (not including those of the aliphatic acid). Other examples of organic lubricants which can be used in the present invention include $C_{8-22}$ aliphatic acids and aliphatic amides, and aliphatic alcohols. Specific examples of such organic lubricants include butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan tetrastearate, anhydrosorbitan ethylene oxide monostearate, oleyl oleate, oleyl alcohol, and lauryl alcohol. These organic lubricants can be used singly or in combination. Lubricant additives can be incorporated in the lubricant singly or in combination. Examples of such additives include oxidation inhibitors (e.g., alkyl phenol), rust preventives (e.g., naphthenic acid, alkenylsuccinic acid, dilauryl phosphate), oil agents (e.g., colza oil, lauryl alcohol), and extreme-pressure agents (e.g., dibenzyl sulfide, tricresyl phosphate, tributyl phosphite).

The lubricant may be incorporated in the magnetic layer in an amount of 0.1 to 2.5 parts by weight per 100 parts by weight of ferromagnetic powder and may also be incorporated in the backing layer in an amount of 0.01 to 0.5 part by weight per 100 parts by weight of carbon black.

Examples of antistatic agents which can be used in the present invention include powders of electrically conductive substances such as graphite, carbon black, carbon black graft polymer, tin oxide-antimony oxide, tin oxide, and titanium oxide-tin oxide-antimony oxide, natural surface active agents such as saponin; nonionic surface active agents such as alkylene oxide, glycerin, glycidol, polyvalent alcohol, polyvalent alcohol ester and alkylphenol-ethylene oxide addition products, cationic surface active agents such as higher alkylamine, cyclic amine, hydantoin derivative, amide amine, ester amide, quaternary ammonium salt, pyridine, phosphonium, and sulfonium; anionic surface active agents containing an acidic group such as carboxylic acid, sulfonic acid, phosphoric acid, sulfuric esters, and phosphoric esters; and amphoteric surface active agents such as amino acids, aminosulfonic acid, sulfuric or phosphoric esters of amino alcohols, and alkyl betaine. These surface active agents can be used singly or in admixture. These surface active agents can be coated on the surface of the magnetic recording medium in an amount of 1 to 550 mg/m². The amount of these surface active agents to be incorporated in the magnetic recording medium is in the range of 0.01 to 10 parts by weight based on 100 parts by weight of ferromagnetic powder. These antistatic agents can be often used for other purposes than antistatic effects, such as dispersion, improvement in magnetic properties and smoothness, and as coating aids.

The carbon black which can be used in the backing layer and the magnetic layer of the present invention includes furnace black for rubber, thermal black for rubber, black for color, acetylene black or the like. Specific examples of abbreviations of carbon blacks commercially available in the U.S.A. include SAF, ISAF, IISAF, T, HAF, SPF, FF, FEF, HMF, GPF, APF, SRF, MPF, ECF, SCF, CF, FT, MT, HCC, HCF, MCF, LFF, and RCF. In particular, carbon blacks classified in ASTM D-1765-82a can be used. These carbon blacks to be used in the present invention each has an average particle size of 5 to 1,000 mµ (as determined by electron microscopy), a specific surface area of 1 to 1,500 m²/g determined by nitrogen adsorption method), a pH value of 2 to 13 (as determined in accordance with JIS K-6221-1982), and dibutyl phthalate (DBP) oil absorption of 5 to 2,000 ml/100 g (as determined in accordance with JIS K-6221-1982). These carbn blacks to be used in the present invention each has a water content of 0 to 20% by weight. In order to reduce the surface resistance of the coating film, carbon black with an average particle size of 5 to 100 mμ is used. In order to control the strength of the coating film, carbon black with an average particle size of 50 to 1,000 mμ is used. For the purpose of controlling the surface roughness of the coating film, finer carbon black particles (100 mμ or less) is used to smoothen the surface of the coating film so that the spacing loss is reduced. For the purpose of roughening the surface of the coating film to reduce the friction coefficient thereof, carbon black with an average particle size of 50 mμ or more is used. Thus, the type and added amount of carbon black are selected depending on the magnetic recording medium.

These carbon blacks may be surface-treated with a dispersant as described above or grafted with a resin before use. There can also be used carbon black obtained by processing the material at a furnace temperature of 2,000° C. or higher so that the surface thereof is partially graphitized. Special carbon blacks include hollow carbon black.

The carbon black is preferably incorporated in the magnetic layer in an amount of 0.1 to 20 parts by weight, preferably 0.3 to 15 parts by weight, based on 100 parts by weight of ferromagnetic powder. For carbon blacks which can be used in the present invention and their physical properties, reference can be made to "Handbook of Carbon Black", (Carbon Black Kyokai, (1971)).

As the abrasive to be incorporated in the magnetic layer and backing layer there can be used a commonly used abrasive. Examples of such an abrasive include α-alumina, γ-alumina, α-γ-alumina, molten alumina, silicon carbide, chromium oxide, corundum, artificial diamond, α-iron oxide, garnet, emery (main component: corundum, magnetite), silica, silicon nitride, boron nitride, molybdenum carbide, boron carbide, tungsten carbide, titanium carbide, quartz, tripoli, diatomaceous earth, and dolomite. Abrasive materials having a Mohs' hardness of 6 or more, preferably 8 or more can be used singly or in a combination of two to four thereof. These abrasives preferably have an average particle size of 0.005 to 5 μm, particularly 0.01 to 2 μm. The abrasive is used in an amount of 0.01 to 20 parts by weight based on 100 parts by weight of binder.

As an organic solvent to be used at the dispersion, kneading and coating steps there can be used in any proportion a ketone such as acetone, methyl ethyl ketone, methyl isobutyl ketone, cyclohexanone, isophorone, and tetrahydrofuran; an alcohol such as methanol, ethanol, propanol, butanol, isobutyl alcohol, isopropyl alcohol, and methyl cyclohexanol; an ester such as methyl acetate, ethyl acetate, butyl acetate, isobutyl acetate, isopropyl acetate, ethyl lactate, and glycol monoethyl ether acetate; an ether such as diethyl ether, tetrahydrofuran, glycol dimethyl ether, glycol monoethyl ether, and dioxane; an aromatic hydrocarbon, chlorinated hydrocarbon such as methylene chloride, ethylene chloride, carbon tetrachloride, chloroform, ethylene chlorohydrin, and dichlorobenzene, N,N-dimethylformaldehyde, hexane, or the like.

The dispersion and kneading method is not specifically limited. The order of addition of these components can be easily selected. The preparation of the magnetic coating and backing layer coating can be accomplished by means of an ordinary kneading machine such as a two-roll mill, three-roll mill, ball mill, pebble mill, trommel, sand grinder, szegvari, attrittor, high speed impeller, dispersing machine, high speed stone mill, high speed impact mill, disperser, kneader, high speed mixer, ribbon blender, cokneader, intensive mixer, tumbler, blender, homogenizer, single shaft screw extruder, and ultrasonic disperser. The kneading and dispersion method is further described in T. C. Patton, "Paint Flow and Pigment Dispersion", (1964, John Wiley & Sons), Shinichi Tanaka, "Kogyo Zairyo (Industrial Materials)", vol. 25, No. 37, 1977, and references cited therein. These kneading and dispersing machines are conventionally combined to effect continuous processing. The coating solution thus processed is then supplied and coated. The kneading and dispersing method is also described in U.S. Pat. Nos. 2,581,414, and 2,855,156. In the present invention, kneading and dispersion can be effected in accordance with any of the methods as described in the above publication to prepare a magnetic coating or backing layer coating.

In order to form the magnetic layer, a proper combination of the above mentioned compositions is dissolved in an organic solvent. The coating solution thus obtained is then coated on a support and dried. If the coated material is used as a magnetic tape, the thickness of the support is in the range of 2.5 to 100 μm, preferably 3 to 70 μm. If the coated material is used as a magnetic disc, the thickness of the support is in the range of 0.03 to 10 mm. If the coated material is used as a magnetic drum, the support may be in the form of cylinder. Examples of support materials which can be used in the present invention include polyesters such as polyethylene terephthalate and polyethylene naphthalate, polyolefins such as polypropylene and polyethylene, cellulose derivatives such as cellulose triacetate and cellulose diacetate, vinyl resins such as polyvinyl chloride and polyvinylidene chloride, plastics such as polycarbonate, polyamide and polysulfone, metals such as, aluminum and copper, and ceramics such as glass. These supports may be subjected to corona discharge treatment, plasma treatment, undercoating, heat treatment, dust-resistant finishing, metallizing, alkaline treatment or the like before coating. These supports are further described in West German Patent 3338854A, JP-A-59-116926, U.S. Pat. No. 4,388,368, and Yukio Mitsuishi, "Sen-i to Kogyo (Fiber and Industry)", vol. 31, pp. 50–55, (1975).

The coating of the magnetic layer and backing layer on the support can be accomplished by an air doctor coating method, blade coating method, air knife coating method, squeeze coating method, dip coating method, reverse roll coating method, transfer roll coating method, gravure coating method, kiss-roll coating method, cast coating method, spray coating method, bar coating method or the like. Other coating methods can be used. These coating methods are further described in "Coating Engineering", Tomokura Shoten, pp. 253–277, (Mar. 20, 1971).

Once the magnetic layer is coated on the support in such a coating process, the ferromagnetic powder in the magnetic layer is optionally oriented immediately in a desired direction while being dried in a magnetic field. The magnetic layer thus formed is then completely dried. During this process, the support is normally conveyed at a rate of 10 to 1,000 m/min., and the drying temperature is controlled to 20° to 130° C. The coated material is optionally subjected to surface smoothening or cut into a desired shape to prepare the present magnetic recording medium. In the preparation of the present magnetic recording medium, surface treatment of filler, kneading/dispersion, coating, heat treatment, calendering, EB treatment, surface abrasion treatment, and cutting are preferably effected in a continuous process. These processes can be optionally divided into several steps.

In these steps, the temperature and humidity are controlled to 10° to 130° C. and 5 to 20 mg/m³ calculated in terms of water content in the air. These steps are further described in JP-B-40-23625 and 39-28368 (the term "JP-B" as used herein means an "examined Japanese patent publication"), and U.S. Pat. No. 3,473,960. In particular, the method disclosed in JP-B-41-13181 is considered to be basic and important in the art.

The present invention provides a magnetic recording medium comprising a magnetic layer containing a finely divided ferromagnetic powder and a binder and optionally carbon black, an abrasive, a lubricant, and the like on one side of a non-magnetic support and a backing layer containing a binder and carbon black on the other side of the non-magnetic support, where the ratio of the number of diffraction points from the ferromagnetic powder in the surface region of the magnetic layer, i.e., N(220)/N(113) as determined by a high energy electron diffraction method is 1.65 or less, to provide excellent running durability and S/N. Furthermore, the glossiness of the magnetic layer is in the range of 150 to 200 to provide excellent running durability and S/N. Preferably, the ferrmagnetic powder contained in the magnetic layer is cobalt-containing iron oxide containing divalent iron in an amount of 1 to 5% by weight based on the weight of trivalent iron to provide excellent running durability and S/N. Furthermore, the magnetic layer has a squareness ratio (Br/Bm) of 0.830 to 0.860 at a temperature of 25° C. to provide excellent running durability and S/N.

Preferably, the ferromagnetic powder is an acicular form and has an N(220)/N(113) ratio of 1.65 or less. This means that the ferromagnetic powder is generally perpendicular to the surface of the magnetic layer. N(220) corresponds to the side of the acicular ferromagnetic powder, and N(113) corresponds to the end surface of the acicular ferromagnetic powder. This means that N(220) is relatively small.

It is considered that since the ferromagnetic powder is arranged perpendicular to the surface of the magnetic layer, it strongly adheres to the support via the binder and comes into contact with a magnetic head or the like at its end surface, providing excellent durability.

The squareness ratio is an essential requirement for higher output. In the present magnetic medium, the ferromagnetic powder is oriented perpendicular to the surface of the magnetic layer while a proper squareness ratio is maintained to improve both running durability and S/N.

The present invention is now described in greater detail with reference to the following examples, but the present invention is not to be construed as being limited to these specific examples. Unless otherwise indicated, all parts, percent and ratio are by weight.

EXAMPLE 1

Components [I] of the following magnetic layer composition were thoroughly kneaded in a kneader. Components [II] were then added to the material. The mixture was then kneaded. Components [III] were then mixed and dispersed in the material before coating to prepare a magnetic coating.

| Magnetic layer composition | |
|---|---|
| [I] Co-containing $\gamma$-$Fe_2O_3$ powder (Nitrogen adsorption specific surface area: 45 m²/g; powder Hc: 900 Oe; average particle size: 0.18 μm; acicular ratio 8/1; Co/divalent Fe: 3%) | 300 parts |
| Vinyl chloride resin (containing $SO_3H$ and epoxy group; MR110, available from Nihon Zeon K.K.) | 40 parts |
| Polyurethane resin (Crisbon 7209, available from Dainippon Ink and Chemicals, Incorporated) | 17 parts |
| Carbon Black (Balcan XC72, average particle size: 30 mμ, available from Cabot) | 13 parts |
| Abrasive: $\alpha$-$Al_2O_3$ (HIT50, available from Sumitomo Chemical Industries, Ltd.) | 18 parts |
| Abrasive: $Cr_2O_3$ (Sl, average particle size: 0.1 μm, available from Nippon Chemical Industrial Co., Ltd.) | 3 parts |
| Oleic acid | 3 parts |
| Cyclohexanone | 250 parts |
| [II] Methyl ethyl ketone | 650 parts |
| tert-Butyl stearate | 3 parts |
| [III] Polyisocyanate (Colonate 3040, available from Nippon Polyurethane) | 20 parts |
| Stearic acid | 3 parts |
| Butyl acetate | 100 parts |

The magnetic coating thus prepared was then adjusted for proper viscosity. The magnetic coating was then coated on a 19 μm-thick polyethylene terephthalate as a non-magnetic support to a dried film thickness of 5.0 μm. The material was then placed while wet in a magnetic field of 3,000 gauss for 0.03 seconds to effect magnetic orientation therein. The material was then dried. Susequently, the material was calendered at a temperature of 90° C. and a linear pressure of kg/cm to form a magnetic layer.

A backing layer coating solution prepared by kneading and dispersing Components [I] of the backing layer composition as shown below in a ball mill and then mixing the material with Components [II] with stirring was coated on the other side of the non-magnetic support to a dried film thickness of 2.0 μm to form a backing layer thereon.

| Backing layer composition | |
|---|---|
| [I] Carbon black (Reben MTP, nitrogen adsportion specific surface area: 10 m²/g; average particle size: 250 mμ, available from Cabot) | 75 parts |
| Carbon black (Conductex SC, nitrogen adsorption specific surface area: 200 m²/g; average particle size: 20 mμ, available Columbian) | 25 parts |
| Polyurethane carbonate resin (FJ2, available from Dainichi Seika K.K.) | 35 parts |
| Phenoxy resin (PKHH, available from Union Carbide) | 10 parts |
| Copper oleate | 0.1 parts |
| Methyl ethyl ketone | 700 parts |
| Cyclohexanone | 300 parts |
| [II] Polyisocyanate (Colonate 2061, available from Nihon Polyurethane) | 5 parts |
| Lubricant (Silicone KF69, available from Shinetsu Chemical Industry Co., Ltd.) | 0.1 parts |
| Lubricant (Oleic acid) | 0.5 parts |
| Methyl ethyl ketone | 100 parts |

The material was then slit into a 1-inch wide tape to prepare a video tape.

EXAMPLE 2

A video tape specimen was prepared in the same manner as in Example 1 except that the calendering conditions of the magnetic layer were altered to a temperature of 80° C. and a linear pressure of 300 kg/cm.

EXAMPLE 3

A video tape specimen was prepared in the same manner as in Example 1 except that the calendering conditions of the magnetic layer were altered to a temperature of 70° C. and a linear pressure of 250 kg/cm.

COMPARATIVE EXAMPLE 1

A video tape specimen was prepared in the same manner as in Example 1 except that the time during which the magnetic layer was in the magnetic field was altered to 0.2 seconds.

COMPARATIVE EXAMPLE 2

A video tape specimen was prepared in the same manner as in Example 1 except that the time during which the magnetic layer was in the magnetic field was altered to 0.2 seconds and the calendering conditions of the magnetic layer were altered to a temperature of 80° C. and a linear pressure of 300 kg/cm.

COMPARATIVE EXAMPLE 3

A video tape specimen was prepared in the same manner as in Example 1 except that the content of divalent iron in the ferromagnetic Co-containing $\gamma$-$Fe_2O_3$ in the magnetic layer was changed from 3% to 5.5%.

COMPARATIVE EXAMPLE 4

A video tape specimen was prepared in the same manner as in Example 1 except that the content of vinyl chloride resin in the magnetic layer was changed from 40 parts to 50 parts and the content of urethane resin in the magnetic layer was changed from 17 parts to 7 parts.

EVALUATION METHOD

Running durability (D.O.)

A video tape specimen was subjected to rapid feeding, rewinding and running 500 times at room temperature (23° C.) and a relative humidity of 50% in a Sony VTR BVH2000. The video tape specimen was then allowed to stand at a temperature of 40° C. and a relative humidity of 80% over 1 week. The video tape specimen was then measured for dropout at room temperature. Thus, the number of dropouts per minute was determined.

Still life test

The time taken until the video output reached —16 dB under an additional load of 200 g while the VTR was in the still image mode was measured.

Color S/N

A color signal was recorded on a video tape specimen in the VTR and then reproduced through the VTR. Color S/N was then determined by means of a noise meter.

Glossiness

Glossiness was determined at an incident angle of 45° in accordance with JISZ 8741, and expressed relative to that of the mirror-like surface of a glass with a refractive index of 1.567 as 100%.

Analysis of N(220)/N(113)(verticality of magnetic material)

It is known that the acicular iron oxide magnetic particles incorporated in a magnetic tape were normally in the form of a single crystal having a [110] axis coinciding with the major axis thereof. Based upon this structure, the orientation state of ferromagnetic powder in the magnetic layer was determined by X-ray diffraction extreme point graphics. X-rays can penetrate relatively deep into a magnetic layer. Therefore, X-ray analysis is adapted to analyze the entire orientation state of a magnetic layer having a thickness of 1 to 5 $\mu$m, but is incapable of analyzing the orientation state of ferromagnetic powder in the surface region of the magnetic layer which affects the running and durability of the video tape.

In the present invention, the analysis of the orientation state of ferromagnetic powder in the surface region of the magnetic layer can be accomplished by a reflection high energy electron diffractiometer (RHEED) commonly used in the analysis of the crystalline azimuth and crystallinity of the extreme surface of a metal specimen. In this method, the incidence angle is low and the penetration depth is as shallow as 50 angstroms.

Apparatus: Hitach, Ltd.'s transmission type electron microscope HITACHI HU-12A with a reflective electron ray diffractometer (HE-2) attached as accessory Measurement conditions:
Accelerating voltage: 100 kV
Electron beam diameter: approx. 0.1 mm $\phi$
Incidence of electron beam: almost horizontal to specimen; i.e., at an incident angle of 85° or more
Direction of measurement: tape running direction
Diffraction pattern: photographed on film Evaulation of the verticality of ferromagnetic powder: With respect to the RHEED spot on the film, the ratio of the number of points of diffraction from the [220] plane and [113] plane (N(220)/N(113)) of $\gamma$-iron oxide in the range of 100° was determined.

Squareness ratio

Squareness ratio was measured in an external magnetic field of 2.0 KOe by means of a vibrating sample magnetometer (available from Toei Kogyo K.K.). Squareness ratio can be determined as the ratio of saturated magnetic flux density ($\phi$m) to residual magnetic flux density ($\phi$r)($\phi$r/$\phi$m).

TABLE 1

| Example No. | N(220)/N(113) | Glossiness | Squareness Ratio | D.O. | Still Durability | Color S/N |
|---|---|---|---|---|---|---|
| 1 | 1.64 | 180 | 0.860 | 8 | 120 min.< |  |
| 2 | 1.30 | 160 | 0.850 | 10 | 120 min.< |  |
| 3 | 1.10 | 150 | 0.835 | 10 | 120 min.< |  |
| Comparative Example 1 | 1.70 | 190 | 0.875 | 45 | 90 min. |  |
| Comparative Example 2 | 1.68 | 167 | 0.870 | 86 | 80 min. |  |
| Comparative Example 3 | 1.64 | 180 | 0.865 | 61 | 50 min. |  |
| Comparative Example 4 | 1.66 | 145 | 0.825 | 86 | 20 min. |  |

As shown in Table 1, the video tape specimens of the present invention were excellent in anti-drop out properties, still life and color S/N. In contrast, Comparative Specimens 1 and 2 had an improper orientation in the crystalline plane of ferromagnetic powder in the magnetic layer and thus were remarkably poor in durability, through excellent in color S/N. Comparative Specimens 3 and 4 exhibited a proper orientation in the crystalline surface of ferromagnetic powder in the magnetic layer but had an improper squareness ratio, and were poor particularly in durability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having on one surface of the support a backing layer comprising a carbon black and a binder and on the opposite surface of the support a magnetic recording layer comprising a ferromagnetic powder and a binder, said ferromagnetic powder being oriented in said magnetic recording layer such that the ratio of the number of diffraction points N(220)/N(113) measured at the surface region of the magnetic layer by high energy electron diffraction is at most 1.65; and the squareness ratio Br/Bm of the magnetic layer is from 0.830 to 0.860 at 25° C.

2. The magnetic recording medium as claimed in claim 1, wherein said magnetic layer has surface glossiness of 150 to 200.

3. The magnetic recording medium as claimed in claim 1, wherein said ferromagnetic powder comprises acicular crystal ferromagnetic particles.

4. The magnetic recording medium as claimed in claim 1, wherein said ratio N(220)/N(113) is at least 1.1.

5. The magnetic recording medium as claimed in claim 1, wherein said ferromagnetic powder comprises $\gamma$-$Fe_2O_3$, Co-containing $\gamma$-$Fe_2O_3$, $Fe_3O_4$, Co-containing $\gamma$-$Fe_3O_4$, $FeO_x$ or Co-containing $\gamma$-$FeO_x$, wherein x is 1.33 to 1.50.

6. The magnetic recording medium as claimed in claim 5, wherein said ferromagnetic powder has a particle size from 0.005 to 1 $\mu$m; a specific surface area of 1 to 70 $m^2/g$; and a water content of 0.2 to 2.0 wt. %.

7. The magnetic recording medium as claimed in claim 5, wherein said ferromagnetic powder comprises at least one cobalt-containing iron oxide.

8. The magnetic recording medium as claimed in claim 7, wherein said iron oxide comprises divalent iron in an amount of 1 to 5% based on the trivalent iron.

9. The magnetic recording medium as claimed in claim 1, wherein said magnetic recording layer comprises from 5 to 30 parts by weight of said binder per 100 parts by weight of said ferromagnetic powder.

10. The magnetic recording medium as claimed in claim 9, wherein said backing layer comprises from 30 to 300 parts by weight of said binder per 100 parts by weight of said carbon black.

11. The magnetic recording medium as claimed in claim 9, wherein said magnetic recording layer comprises from 5 to 40% by weight of a polyisocyanate based on the total weight of said binder.

12. The magnetic recording medium as claimed in claim 9, wherein said magnetic recording layer comprises from 0.1 to 20 parts by weight of carbon black per 100 parts by weight of said ferromagnetic powder.

13. The magnetic recording medium as claimed in claim 12, wherein said magnetic recording layer further comprises from 0.01 to 20 parts by weight of at least one abrasive powder having a Moh's hardness of at least 6 and a particles size of 0.005 to 5 $\mu$m, per 100 parts by weight of said binder.

14. The magnetic recording medium as claimed in claim 13, wherein said magnetic recording layer further comprises a lubricant.

15. The magnetic recording medium as claimed in claim 11, wherein said binder comprises at least one thermoplastic resin, thermosetting resin or reactive resin comprising at least one functional group selected from an acidic group, an alkyl ester, an amino acid, an amphoteric group, an amino group, an imino group, an imide group, an amide group, an epoxy group, a hydroxyl group, an alkoxyl group, a thiol group, a halogen atom, a silyl group and a siloxane group in an amount of $1 \times 10^{-6}$ to $1 \times 10^{-2}$ equivalent per gram of said resin.

16. The magnetic recording medium as claimed in claim 5, wherein said ferromagnetic powder comprises acicular crystal ferromagnetic particles.

17. The magnetic recording medium as claimed in claim 6, wherein said ferromagnetic powder comprises acicular crystal ferromagnetic particles.

18. The magnetic recording medium as claimed in claim 7, wherein said ferromagnetic powder comprises acicular crystal ferromagnetic particles.

19. The magnetic recording medium as claimed in claim 18, wherein said acicular crystals have an acicular ratio of 3/1 to 20/1 and a long-axis length of 0.05 to 0.5 $\mu$m.

* * * * *